United States Patent [19]

Steiner

[11] 4,039,619

[45] Aug. 2, 1977

[54] PROCESS FOR THE SELECTIVE REMOVAL OF HYDROGEN SULFIDE FROM HOT COAL GASIFICATION GASES

[75] Inventor: Peter Steiner, Edison, N.J.

[73] Assignee: Foster Wheeler Energy Corporation, Livingston, N.J.

[21] Appl. No.: 628,635

[22] Filed: Nov. 4, 1975

Related U.S. Application Data

[63] Continuation-in-part of Ser. No. 432,277, Jan. 10, 1974, abandoned.

[51] Int. Cl.$^2$ .............................................. B01D 53/34
[52] U.S. Cl. .................................................... 423/230
[58] Field of Search .................... 423/230, 231, 561 R

[56] References Cited

U.S. PATENT DOCUMENTS 2,220,849  11/1940  Riblett ............................ 423/230 X
2,551,905  5/1951  Robinson ............................ 423/230

FOREIGN PATENT DOCUMENTS 630,042  10/1949  United Kingdom ................. 423/561

*Primary Examiner*—Earl C. Thomas
*Attorney, Agent, or Firm*—Marvin A. Naigur; John E. Wilson

[57] ABSTRACT

Continuous process for the selective removal of hydrogen sulfide from a mixture of hot coal gasification gases containing hydrogen sulfide by contacting such mixture in a reaction or desulfurizing zone at an elevated temperature with a nickel-containing material whereby the nickel reacts with the hydrogen sulfide to form solid compounds from which the nickel content can be regenerated by oxidation and recycled back to the reaction zone, thereby effectively removing hydrogen sulfide from the hot gas mixture.

10 Claims, No Drawings

PROCESS FOR THE SELECTIVE REMOVAL OF HYDROGEN SULFIDE FROM HOT COAL GASIFICATION GASES

CROSS-REFERENCE TO RELATED APPLICATION

The present application is a continuation-in-part of application Ser. No. 432,277, filed on Jan. 10, 1974 and now abandoned.

BACKGROUND OF THE INVENTION

With the advent of air pollution requirements, it has been necessary to remove sulfur-containing gaseous contaminants from hot coal gasification effluent gases, some of which (e.g. $SO_2$) have previously been expelled to the atmosphere. Other sulfur-containing gaseous contaminants such as hydrogen sulfides and other sulfides such as $CS_2$ that are customarily found in such effluent gases, have also had to be removed not only because of corrosion problems they would induce but also because the oxides of sulfur formed during combustion would be a nuisance to coal gas consumers.

Heretofore, hot $H_2S$ containing hot coal gasification gas mixtures have been purified by having had their $H_2S$ content removed by conventional scrubbing, such as by wet or dry scrubbing, e.g., by caustic scrubbing. The dry method of scrubbing, now largely superseded by the wet method, consisted in the removal of sulfides such as $H_2S$ through contact with dry iron oxide or hydroxide and subsequent extraction of the spent and reactivated hydroxide with carbon disulfide for recovery of the sulfur. On the other hand, wet scrubbing has simplified considerably the overall coal gas purification through scrubbing of the coal gas with various liquids, e.g. a caustic solution such as a dilute (3%) solution of sodium carbonate. Other wet methods have utilized dilute (1-2%) soda-ash solutions with ferric hydroxide suspended therein; aqueous arsenious oxide in soda ash; cold solutions of organic amines such as 50% aqueous solutions of diethanolamine; sodium phenolate comprising a fairly concentrated solution of phenol in caustic soda; etc. However, wet scrubbing has not proved to be entirely satisfactory since it often involves the need of costly specialized equipment such as absorbers, e.g. bubble-cap or packed absorption towers, heat exchangers, and the like. A significant advantage of the present invention lies in its ability to effect coal gas purification through removal of $H_2S$ therefrom in a much simpler manner than heretofore afforded by the various scrubbing methods previously utilized. Thus, in accordance with this invention, the $H_2S$ contamination of hot coal gasification effluent gases can readily be accomplished through use of a nickel-containing material or acceptor at elevated temperatures, thereby obviating the need for costly heat transfer equipment previously associated with scrubbing, which material or acceptor can easily be regenerated by oxidation, e.g. air oxidation.

SUMMARY OF THE INVENTION

This invention relates to a process for the selective removal of hydrogen sulfide from a mixture of hot coal gasification effluent gases containing same, and, more particularly, relates to a process for the selective removal of hydrogen sulfide from a mixture of hot $H_2S$-containing coal gasification effluent gases by reaction of such mixture with a nickel-containing material or acceptor, whereby the nickel reacts with the hydrogen sulfide to form solid compounds from which the nickel content can be regenerated by oxidation and recycled back to the reaction zone for further reaction with more of the $H_2S$-containing hot coal gasification effluent gas mixture.

DESCRIPTION OF THE PREFERRED EMBODIMENTS

In a preferred embodiment of this invention, a suitable coal gas effluent such as the ordinary hot coal gas effluent from a conventional coal gasifier, operated at temperatures upward of 900° F., usually about 1000° F. or above, is passed over a nickel-containing material or acceptor at an elevated temperature in a suitable reactor or reaction zone. The hot coal gasification effluent gases, as utilized herein, may be defined in terms of their comprising a mixture containing hydrogen and carbon monoxide in a ratio of 0.7 to 1.3 volumes of hydrogen per volume of carbon monoxide, along with some carbon dioxide, water vapor, methane, and hydrogen sulfide, the sulfur content being about 0.1 to about 6.0 mole %, usually about 0.1-0.4 mole %. Of course, as will be appreciated by the art, the type of coal that is gasified is not of significance and is intended to include all conventional types of coal that are used in the usual coal gasification processes such as lignite, anthracite, sub-bituminous, ordinary bituminous coal, etc. This is so because the $H_2S$ concentrations from the coal sources of present conventional processes are relatively of the same order of magnitude, as indicated above, since they ordinarily represent the usual ranges of sulfur content in conventional coals used as fuel. The nickel-containing material or acceptor is preferably one of a nickel-containing: metal, metal alloy such as nickel-aluminum, or other nickel-containing material, or the oxides thereof. Such a material or acceptor can, of course, be supported on an inert carrier of any of the readily available types. Thus, representative examples of carrier materials which can be used as a solid support component of the nickel-containing material or acceptor are the various aluminous and siliceous materials of natural or synthetic origin such as natural and acid treated clays, bauxite, aluminum oxide, activated alumina, kieselguhr, alumina gel, silica gel, silica-alumina gel, magnesia gel, mixed gels, magnesium oxide, chromium oxide, chromite, vanadium oxide, vanadite, magnesium silicate, pumice, kaolin, Carborundum, Alundum, etc. Additional, exemplary support materials include activated carbon. The nickel-containing material or acceptor is preferably nickel.

Broadly speaking, the hot coal gasification effluent gaseous stream is preferably passed through a bed of the nickel-containing material or acceptor at a temperature between about 1000° F and about 1450° F, preferably between about 1050° F and about 1350° F. However, when the hydrogen content of the effluent is high, it is preferred to conduct treatment of such a high hydrogen content-effluent at temperatures of about 1000° F. to about 1350° F, preferably about 1050° F. to about 1250° F, and most preferably between about 1100° F to about 1150° F. The hot coal gasification effluent gas is fed into the reaction zone at a temperature close to the desulfurization temperature, thereby keeping said reaction zone in heat balance. As the nickel content of the nickel-containing material or acceptor becomes spent by becoming transformed to solid nickel sulfide compounds, these latter compounds are withdrawn from the bed and replaced with regenerated nickel-containing material, continuously added to the bed. The spent nickel-containing solids are withdrawn into a regeneration zone wherein they are subjected to controlled oxidation with an oxygen-containing gas such as air.

In a preferred embodiment, the spent nickel-containing material or acceptor is regenerated by aeration, i.e., by having air blown through the spent nickel-containing bed. By adjustment of the velocity of the hot coal gasification effluent gases fed into the reactor or desulfurizing or reaction zone to the characteristics of the nickel-containing solids, the latter can be maintained in the form of a fluidized bed or suspended in the gases for the time of treatment. Preferably, the regeneration of the nickel-containing material or acceptor is effected at a temperature sufficient to satisfy the equilibrium considerations governing the regeneration reaction as well as the reaction between Ni and $SO_2$.

Since the hydrogen content of the hot coal gasification effluent is ordinarily high, it is preferable to conduct treatment of such effluent with nickel-containing material or acceptor at temperatures on the low side of the temperature range set forth above, about 1000° F. to about 1350° F preferably between about 1050° F. and about 1250° F, most preferably between 1000° F. and 1100°–1150° F so as to counteract the tendency of hydrogen to form $H_2S$.

The spent acceptor or nickel-containing material comprising solid compounds of nickel sulfide, upon separation from the hot coal gasification gas effluent, can be regenerated in a separate regeneration zone wherein the NiS compounds can be reacted directly with oxygen from the air by means of aeration wherein air is blown through the spent nickel-containing material or acceptor at temperatures approximating those in the reaction zone, i.e. 1000° F. to 1450° F, preferably about 1000° F. to about 1350° F, and most preferably about 1050° F to about 1150° F. In the regeneration zone, the solid NiS compounds are reacted with the oxygen of the air to form sulfur dioxide and the free nickel-containing material, and are then separated, with the nickel-containing solids being restored to the reaction zone for further contact with the $H_2S$ present in the hot coal gasification gaseous effluent newly introduced therein.

An example is included herebelow to illustrate conventional coal gasification, in respect of the usual types of conditions employed. The results tabulated below illustrate the state of the art and the quality of the effluent product and its components. Such results are enhanced by application of the essence of the present invention thereto.

EXAMPLE

Fuel-Anthracite or Mildly Caking Bituminous Coals

| | Fuel Anthracite Coal | | Fuel Mildly Caking Bituminous Coal | |
|---|---|---|---|---|
| Gasifying Medium | Oxygen and Steam | Air and Steam | Oxygen and Steam | Air and Steam |
| Typical Composition at Gasifier Outlet - Mole % | | | | |
| CO | 9.2 | 13.3 | 25.7 | 19.0 |
| $CO_2$ | 14.7 | 13.3 | 15.8 | 6.2 |
| $H_2$ | 20.1 | 19.6 | 32.2 | 11.7 |
| $H_2O$ | 50.2 | 10.1 | 23.1 | 11.5 |
| $CH_4$ | 4.7 | 5.5 | 2.4 | 0.5 |
| $C_2H_6$ | 0.5 | nil | nil | nil |
| $N_2$ | — | 37.5 | 0.8 | 51.1 |
| $C_2H_4$ | — | — | — | — |
| Others | 0.6 | 0.7 | — | — |
| Higher Heating Value (Dry Basis) BTU/SCF | 300 | 180 | 275 | 118 |

A latitude of modification, change, and substitution is intended in the foregoing disclosure, and in some instances some features of the invention will be employed without a corresponding use of other features. Accordingly, it is appropriate that the appended claims be construed broadly and in a manner consistent with the spirit and scope of the invention described herein.

What is claimed is:

1. A process for the selective removal of hydrogen sulfide from hot coal gasification effluent gases containing same, comprising contacting a hydrogen sulfide-containing coal gasification effluent gas in a reaction zone containing a solid nickel acceptor at a temperature range between about 1000° F and about 1450° F whereby said nickel acceptor is at least partially sulfided; withdrawing the sulfided nickel acceptor from the reaction zone to a regenerating zone; and subjecting the sulfided nickel acceptor to a source of oxygen at a temperature which is approximately the same as that in the reaction zone, said temperature being from about 1000° F to about 1450° F, thereby forming sulfur dioxide and a regenerated nickel acceptor.

2. A process according to claim 1 wherein the temperature range in said reaction zone is between about 1000° F and about 1350° F.

3. A process according to claim 2 wherein the temperature range is between about 1000° F and about 1150° F.

4. A process according to claim 1 wherein the temperature range in said regenerating zone is between about 1050° F and about 1350° F.

5. A process according to claim 4 wherein the temperature range is between about 1050° F and about 1150° F.

6. A process according to claim 1 wherein the temperature range in said reaction zone is between about 1000° F and about 1350° F and the temperature range in said regenerating zone is between about 1050° F and about 1350° F.

7. A continuous process for the selective removal of hydrogen sulfide from hot coal gasification effluent gases containing same, comprising contacting a hydrogen sulfide-containing coal gasification effluent gas in a reaction zone containing a solid nickel acceptor at a temperature range between about 1000° F and about 1450° F whereby said acceptor is at least partially sulfided; withdrawing the sulfided acceptor from the reaction zone to a regenerating zone; subjecting the sulfided acceptor to a source of oxygen at a temperature which is approximately the same as that in the reaction zone, said temperature being from about 1000° F and about 1450° F, thereby forming sulfur dioxide and a regenerated nickel acceptor; removing sulfur dioxide from the regeneration zone; and supplying the regenerated nickel acceptor to the reaction zone.

8. A continuous process according to claim 2 wherein the regenerated nickel acceptor is continuously supplied to the reaction zone to maintain the nickel and nickel sulfide composition therein constant for a constant rate of sulfur removal from the hot coal gasification effluent gas in said reaction zone.

9. A continuous process according to claim 2 wherein the hot coal gasification effluent gas is fed into the reaction zone at a temperature close to the desulfurization temperature, thereby keeping said reaction zone in heat balance.

10. A continuous process according to claim 2 wherein the regeneration of the nickel acceptor is effected at a temperature sufficient to satisfy the equilibrium considerations governing the regeneration reaction as well as the reaction between Ni and $SO_2$.

* * * * *